(No Model.)

F. A. LA ROCHE.
SYSTEM OF ELECTRICAL DISTRIBUTION.

No. 465,594. Patented Dec. 22, 1891.

Witnesses:
Henry Drury
Jesse Heller

Inventor:
Frederick A. La Roche
by Mark Wilks Collett
Atty.

UNITED STATES PATENT OFFICE.

FREDERICK A. LA ROCHE, OF PHILADELPHIA, PENNSYLVANIA, ASSIGNOR TO THE LA ROCHE ELECTRIC WORKS AND GEORGE H. EARLE, JR., OF SAME PLACE.

SYSTEM OF ELECTRICAL DISTRIBUTION.

SPECIFICATION forming part of Letters Patent No. 465,594, dated December 22, 1891.

Application filed October 9, 1890. Serial No. 367,607. (No model.)

*To all whom it may concern:*

Be it known that I, FREDERICK A. LA ROCHE, a citizen of the United States, residing in the city and county of Philadelphia and State of Pennsylvania, have invented certain new and useful Improvements in Systems of Electrical Distribution, of which the following is a full, clear, and exact description, reference being had to the accompanying drawings.

My invented system of electrical distribution has among its objects the equalization of the difference of potential between the leads and the effecting of a more economical distribution, especially in the prime cost of the wire, which, as is well known, is a great expense, especially in low-pressure circuits.

In former systems of electrical distribution a substantial equality in difference in potential throughout the line was obtained by joining poles of like sign to the extremities of the same lead and causing a current of substantially the same electro-motive force to be impressed on each end of said lead. In this invention I have reversed the direction of the lead bearing the negative current with reference to the lead bearing the positive current, and in my preferred form have connected the negative leads near the point where they are connected electrically to the negative poles by a shunt, utilizing in the second case the principle of permitting the current to travel in either direction in which it will find the least resistance, and in both cases the principle that a conductor will carry two currents moving in opposite directions thereon unitedly of much greater quantity than it could carry if the two currents were united into one and running in one direction.

The construction and operation of my invented system are fully described in the following portions of my specification, and shown in the accompanying drawings, in which—

Figure 1:
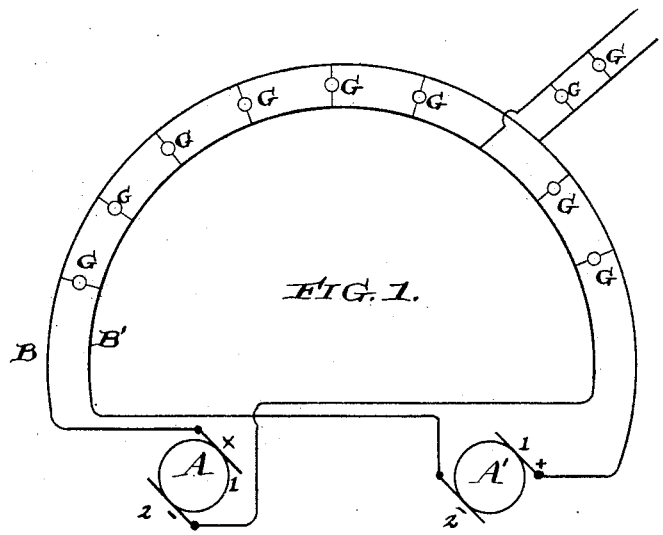
Figure 2:
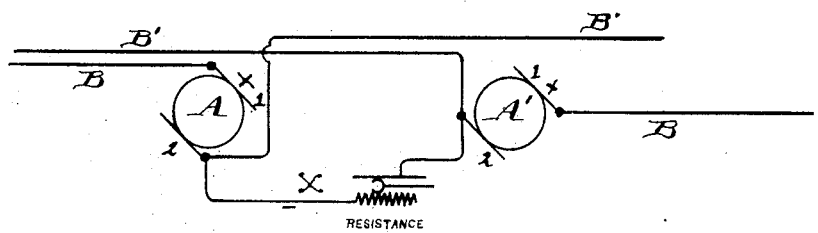

Figure 1 is an illustration of my invented system, and Fig. 2 is an enlarged view of a station end showing the shunt.

Between the positive poles of two sources of electricity A A', I run the lead B, electrically connected with each positive pole 1 1, with translating devices G G G G, connected electrically to said lead at points intermediate between the points of connection of the lead with the poles 1 1. Between the negative poles 2 2 of said sources of electrical energy I run the lead B', to which also translating devices G G G G are connected electrically between its points of connection with the poles 2 2. It will be noticed, however, that on referring to the drawings, if the lead B is followed from the positive pole 1 and the negative lead B' from the pole 2 of the generator A toward their points of electrical connection with the poles of the other generator the paths traversed will be substantially in the reversed direction with respect to each other, and if the lead B is followed from the positive pole of the generator A and the lead B' from the negative pole of the generator A' the paths traversed will be substantially the same in direction. It will therefore appear that the current having passed over a translating device, in order to return to its own generator, will continue its course in the same direction along the line as it had formerly moved. Suppose now that the current from the positive pole of the generator A supplies most of the current used on the translating devices situated near that generator, measuring along the positive lead, and in a similar way the current from the generator A' supplies most of the current used on the translating devices near it, measuring also on the positive lead. It will be seen that a great portion of the negative lead carries two currents running in opposite directions and each of them of less quantity than the main current and comparatively equal in quantity (though this latter will vary when the comparative quantity produced by the generators, respectively, is varied) and that consequently this lead can be reduced to a size much less than that of the positive, although this positive lead will be of much less size than that required for an equal duty in the systems ordinarily in use without increasing the resistance of the circuit.

Upon this system I can attain a substantial equality of potential along the line in several ways. I can arrange the resistance offered by the leads so that a substantially equal resistance will be opposed by the line to each rate of current which will pass through a translating device as set thereof; or I can employ, so far at least as the positive lead is concerned, the system set forth in my patent of June 2, 1891, No. 453,597, in which an equal electro-motive force is impressed upon each end of the line, or other means which may be convenient for the purpose may be employed.

I find that I obtain advantageous results when an approximately equal quantity of electricity is impressed upon the positive lead at its point of electrical connection with each source of electrical supply, as by this means the greater portion of the negative lead has flowing on it an approximately equal quantity of current in each direction. I also obtain advantageous results when the electro-motive force of the current impressed on the positive lead at its points of electrical connection with the generators is substantially equal, as thereby the substantial equality of difference of potential between the leads, and consequently the equality of strength of current flowing over each translating device which offers the same resistance, is most readily secured. I do not mean by this, however, that advantageous results in a less degree cannot be obtained when neither of these conditions are complied with. I think I get my best results when they are both complied with, but do not limit my invention with reference to them.

While my device thus constructed is very effective and an improvement of great value over the devices previously devised, I find it preferable for general use to add a shunt, as X, to secure a flow of more or less freedom between the negative leads at or near the points of their electrical connection with poles 2 2 of the generators. By this means I permit the current flowing over a translating device to the negative lead to seek in all cases the line of least resistance along it back to its generator. It will of course divide, and the amount flowing along each path can, if desired, be found by the formula for divided circuits. The amount of current that will take each path and the amount of resistance which will have to be introduced into the shunt X, if any, can be determined practically by a competent workman in any of the known ways of determining the amount of resistance to be introduced into a circuit to regulate the strength of the current.

I do not limit myself to the mechanism minutely described in the foregoing specification, as many changes can be made therein without departing from the spirit of my invention, as I consider that I am the pioneer inventor in systems of electrical distribution where two generators are connected electrically, like poles to like poles, and the negative lead follows substantially the path of the positive lead, but in a reversed direction.

What I desire to secure by Letters Patent is—

1. The combination, with a pair of sources of electricity, of a lead electrically connected to and connecting the positive poles of said sources of electricity, and a lead connected to and connecting the negative poles of said sources of electricity and following substantially the same path as the lead connecting the said positive poles, but in a reversed direction, and translating devices electrically connected between the leads at various points thereon between the points of electrical connection thereof with the sources of electrical energy, substantially as described.

2. The combination, with a pair of sources of electricity, of a lead electrically connecting the positive poles of said sources of electricity and impressed at its points of electrical connection therewith by a current of equal electro-motive force, a lead connected to and electrically connecting the negative poles of said sources of electricity and following substantially the path of the lead connecting the positive poles, but in a reversed direction, and translating devices electrically connected between the leads at various points thereon between the points of electrical connection thereof with the sources of electrical energy, substantially as described.

3. The combination, with a pair of sources of electrical energy adapted to generate a substantially equal quantity of electricity, of a lead connecting electrically the positive poles of said sources of electricity and impressed at each end with a current of equal electro-motive force, a lead connected to and electrically connecting the negative poles of said sources of electricity and following substantially the path of the lead connecting the positive poles, but in a reversed direction, and translating devices electrically connected between the leads at various points thereon between the points of electrical connection thereof with the sources of electrical energy, substantially as described.

4. The combination, with a pair of sources of electricity, of a lead connecting electrically the positive poles of said sources of electricity, a lead connecting electrically the negative poles of said sources and following substantially the path of the lead connecting the positive poles, but in a reverse direction, a shunt connecting the portions of said negative lead near the points of electrical connection with the poles of the generators, and translating devices electrically connected between the leads at various points thereon between the points of electrical connection thereof with the sources of electricity, substantially as described.

In testimony whereof I have hereunto affixed my signature this 8th day of October, A. D. 1890.

FREDERICK A. LA ROCHE.

Witnesses:
MARK WILKS COLLET,
CHARLES E. LEX.